United States Patent [19]
Everett et al.

[11] 3,880,146
[45] Apr. 29, 1975

[54] NOISE COMPENSATION TECHNIQUES FOR BIOELECTRIC POTENTIAL SENSING

[76] Inventors: Donald B. Everett, 1941 Hillman Ave., Belmont, Calif. 94002; Louis W. Schlenz, 809 Ladis Ct., Sunnyvale, Calif. 94086

[22] Filed: June 4, 1973

[21] Appl. No.: 366,338

[52] U.S. Cl. ............................................. 128/2.06 B
[51] Int. Cl. ................................................ A61b 5/04
[58] Field of Search ..... 128/2.06 B, 2.06 E, 2.06 G, 128/2.06 R, 2.06 V, 2.1 A, 2.1 B, 2.1 E, 2.1 M, 2.1 R, 2.1 Z

[56] References Cited
UNITED STATES PATENTS

| | | | |
|---|---|---|---|
| 3,476,103 | 11/1969 | Stenger et al. | 128/2.06 B |
| 3,500,823 | 3/1970 | Richardson et al. | 128/2.06 E |
| 3,709,212 | 1/1973 | Koeblitz | 128/2.06 B |
| 3,742,947 | 7/1973 | Hashem | 128/2.06 B |
| 3,757,778 | 9/1973 | Graham | 128/2.06 B |

Primary Examiner—William E. Kamm
Attorney, Agent, or Firm—Limbach, Limbach & Sutton

[57] ABSTRACT

A measuring circuit having one or more inputs connected to one or more bioelectric sensing electrodes couples its output to a waveform display or recording device in a manner to remain ungrounded and additionally has its common point maintained at the common voltage of a body under measurement. Undesirable common voltage variations in the body other than the desired bioelectric signal are sensed and the amplifier common point is varied in voltage in a similar way. A second amplifier connected in a unity gain voltage follower mode has an output that drives the amplifier common point. This second amplifier is connected to two electrodes, one of which is connected to an input of the second amplifier and the other of which is connected to a common reference point of the second amplifier.

10 Claims, 5 Drawing Figures

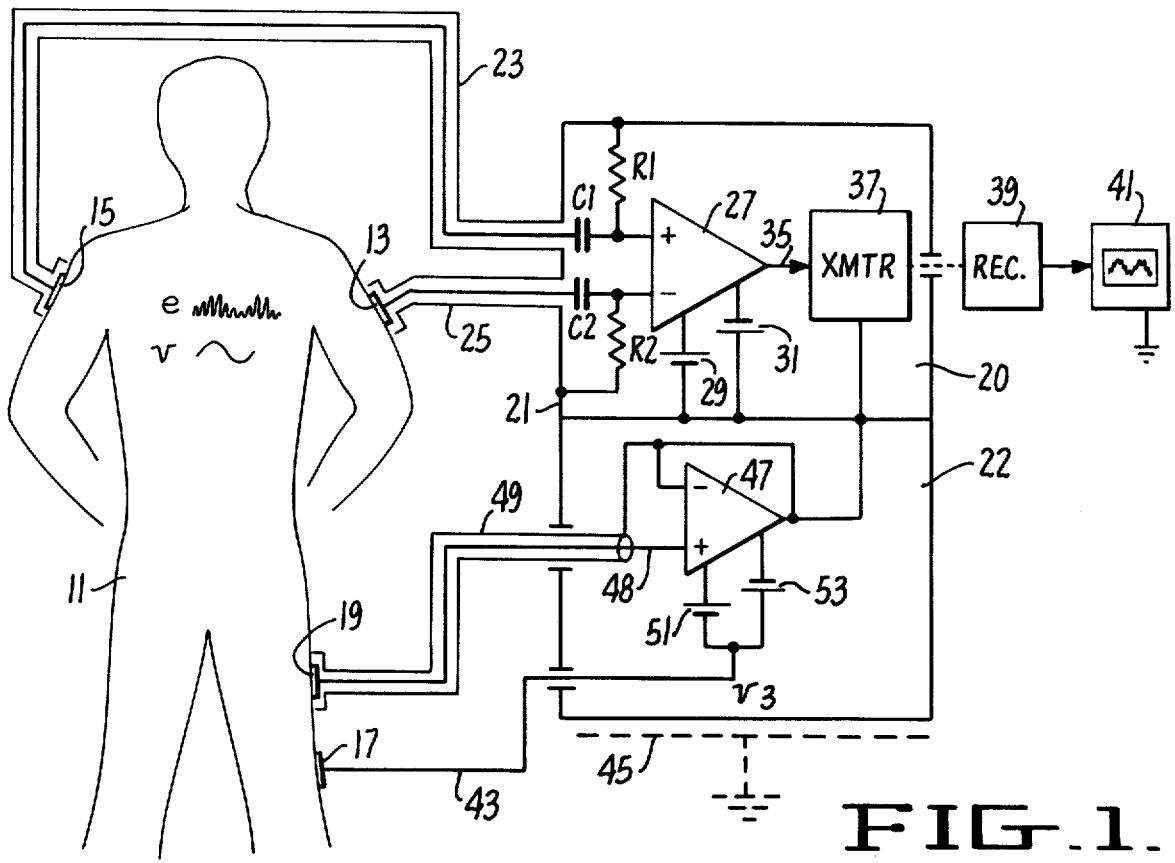
FIG. 1.
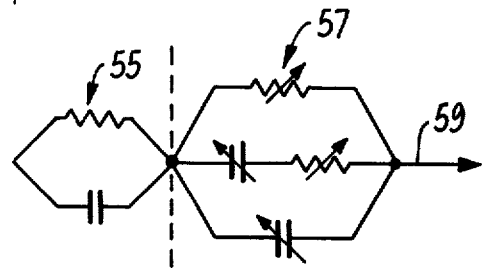
FIG. 3.
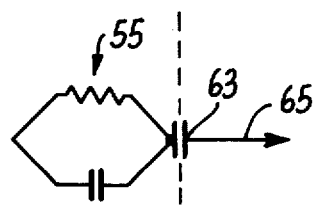
FIG. 4.
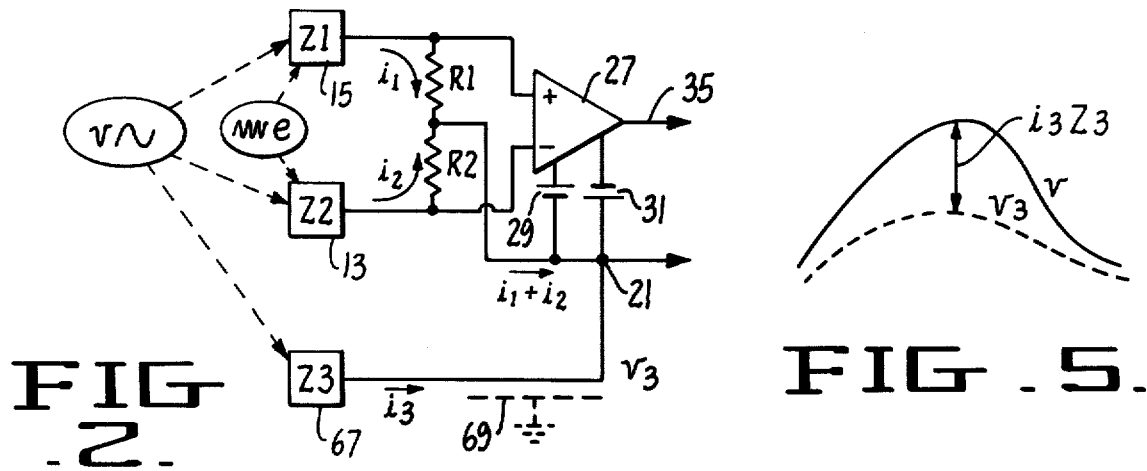
FIG. 2.
FIG. 5.

NOISE COMPENSATION TECHNIQUES FOR BIOELECTRIC POTENTIAL SENSING

BACKGROUND OF THE INVENTION

This invention relates generally to techniques of measuring voltage differences across an object, namely across a biological body.

There are many situations where it is desired to measure voltage differences between two or more points across an object or a portion of an object. Two or more electrodes electrically communicate with the two or more spaced apart locations of an object for measuring the potential differences therebetween and a common electrode is generally attached to another portion of the body. Potential variations within the body between said two or more locations are thus measured. A common specific example of this type of measurement is when the body is a human being and the potential being measured is internally generated in the human body by the heart or some other element. Examples of this technique of measurement include clinical and monitoring applications of electrocardiography (EKG), including vector cardiography, electroencephalography (EEG), and electromyography (EMG).

There are several types of electrodes that are utilized for an operable communication of the body to testing equipment. A commonly used electrode is a low impedance direct contact "wet" type in which an electrode contacts the body with the aid of an electrically conductive paste or gel for making positive electrical contact with the body surface. Another type of electrode is a "dry" high impedance type which is held against the body with only the normal skin or organ fluids therebetween. Another "dry" type of electrode is a capacitive electrode wherein the electrical contact is separated from the body by a very small distance so the conductive contact does not touch the body directly. The capacitive type of electrode is described in detail in U.S. Pat. No. 3,568,662.

In electrocardiography with human patients, the common practice is to attach two or more sensing electrodes to various locations on the skin. Another electrode serves as a common connection and is generally attached to the right leg. The potential difference between the various sensing electrodes is detected by electrical connection of these electrodes to some type of instrumentation electronic circuit whose output is proportional to such potential differences. The instrumentation electronic circuit has a common point that is electrically connected directly to the common body electrode. In some cases, the common point is also electrically connected to an earth ground, but for safety, especially in continuous monitoring of human patients, the common point remains ungrounded. It is the output of the electronic circuit relative to the common point that carries a signal proportional to the bioelectric internally generated voltage being measured.

It has been noted that there is a base line drift or undesired voltage variation in the output of the differential type amplifier that results from some other source than the desired internally generated potential that is to be measured. The cause of these undesired signal components have been little understood. They have on occasion been reduced by the use of electronic filtering of very low frequencies at the output of the instrumentation electronic circuit but filtering is often undesirable because some information of the desired internal bioelectric potential is also lost.

Therefore, it is a primary object of the present invention to provide a method and apparatus for minimizing undesirable signal components (baseline variations) of such equipment.

SUMMARY OF THE INVENTION

One source of undesirable signal components in a system using an earth ground is believed to be potential gradients across the body skin as a result of its finite impedance and resulting current flowing therethrough toward the common grounded electrode. The two or more sensing electrodes which are spaced apart across an object sense a potential difference resulting from this current flow that is not rejected by a differential input operational amplifier to which the electrodes are connected but rather appears at its output as part of the signal. This current is induced in the object by varying electrostatic or electromagnetic fields. This differential voltage is substantially reduced by the disconnection of the earth ground from the common electrode since this induced current has no firm ground potential to which it can flow. It has been puzzling, therefore, prior to the present invention, that under certain circumstances a measured output signal in an ungrounded system undesirably varies in accordance with some noise in addition to the desired internally generated bioelectric signal. Some have suggested that this is due to an instability of the electrodes. it has been noted that slowly moving electrostatic fields, such as those generated by charged clothing being worn by a person moving about the object being measured, cause a substantial voltage output baseline variation wholly unrelated to the potential being measured even in an ungrounded system.

It has been discovered as a part of the present invention that 60 Hz building power systems, the movement of charged clothing and other electrostatic field producing mechanisms cause the body being measured to change substantially in its potential. It has been discovered that these voltage variations cause a current to flow in the common electrode which creates a voltage drop across the electrode and thus causes the instrumentation electronic circuit common point to differ from a common voltage of the body being measured. The common electrode current is believed to result from some impedance (primarily capacitive) coupling of the isolated common point with an earth ground, and corona. It has been found as part of the present invention that a solution to this problem is provision of a circuit to maintain the instrumentation electronic circuit common point at the same common voltage as the body being measured in an ungrounded system. It has been found that the undesired baseline variations (noise) previously observed when charged clothing, for instance, was passed near a human patient having an electrocardiograph do not occur when the differential amplifier common point is varied in voltage according to the present invention. This technique used with "dry" sensing electrodes makes an especially good bioelectric monitoring system. No low frequency signal filtering is required to reduce this noise and thus more information as to the desired bioelectric signal is obtained.

According to another aspect of this invention, an electronic technique has been devised for detecting a common body surface potential and developing an output voltage corresponding thereto from which current can be drawn to drive the isolated common point discussed above or for some other purpose. A common electrode is attached to the body and electrically connected with a common point of a second amplifier. The second amplifier is a high gain differential input operational amplifier connected in a unity gain voltage follower mode with its noninverting input connected to a second common electrode. The result is that the output of the second amplifier follows the common voltage of the body as sensed by the second electrode and further has a capability of delivering some magnitude of current for driving either the common point of the isolated instrumentation circuit or some other load including loads unrelated to bioelectric potential monitoring equipment.

Most applications of the various aspects of the present invention appear to be in a human electrocardiography as described with respect to its preferred embodiment hereinafter. However, it will be understood that the various aspects of the present invention are applicable for measurement of internally generated biological electric potentials of a wide range of biological bodies, including those of animal, human, plant, organism or cell. The invention is also applicable to measurement of potentials at one point or between two or more points of a non-biological object having a finite surface electrical impedance.

BRIEF DESCRIPTION OF THE DRAWINGS

FIG. 1 illustrates a human electrocardiography application of the electronic techniques of the present invention;

FIG. 2 shows a simplfied schematic circuit of prior art electronic techniques;

FIGS. 3 and 4 suggest human skin and skin contacting electrode equivalent circuits; and FIG. 5 is an example voltage waveform diagram used in explaining the operation of the circuits of FIGS. 1 and 2.

DESCRIPTION OF THE PREFERRED EMBODIMENTS

Referring to FIG. 1, a patient 11 has electrodes 13 and 15 strapped on his left and right arms, respectively, in a common manner for monitoring. The electrodes 13 and 15 are provided for sensing the desired bioelectric potential generated by the patient's heart and may be of the low impedance, high impedance or capacitive type discussed above. More than two electrodes can be used per existing techniques but only two are illustrated for simplicity. The usual common electrode 17 is attached to a leg of the patient. The techniques of the present invention call for yet another reference electrode 19 to be attached to the patient. The electrodes 17 and 19 can be placed anywhere on the body as the current drawing electrode 17 is not positioned too close to the voltage sensing electrodes 13, 15 and 19. It is desired that the electrodes 17 and 19 form a direct current circuit with the body, and therefore, they are not of a capacitive type. The electrode 17 must be capable of carrying a current while the electrode 19 need carry substantially no current, as described hereinafter.

The electronic elements are contained within a common shield 21 which physically forms two enclosed compartments 20 and 22. A cable 23 has an inner conductor connected between the electrode 15 and a noninverting input of a high gain instrumentation differential amplifier 27. A second cable 25 has an inner conductor connecting the electrode 13 to the inverting input of the amplifier 27. Each of the cables 23 and 25 contains a shield around its inner conductor, the shields being electrically connected to the common shield 21. As is standard at the input of differential amplifiers in this application, resistors R1 and R2 are each connected between the common potential shield 21 and the non-inverting and inverting inputs, respectively, of the amplifier 27. Values of R1 and R2 of less than 10 megohms each are preferred for "dry" type electrodes in order to minimize surface effects of the electrodes on the skin. The capacitors C1 and C2, positioned respectively in the electrical path from the electrodes 15 and 13, to filter signals generated from random and unpredictable half-cell potentials at the skin/electrode or skin itself.

Individual amplifiers are sometimes installed directly on the sensing electrodes (13 and 15) in order to obtain some increase in signal-to-noise. The problems are the same as described herein with respect to the figures since the individual amplifiers share an electrical common and have similar input resistances.

Battery or other isolated power sources 29 and 31 are provided to drive the amplifier 27 and are both connected to the common voltage shield 21. An output 35 of the amplifier 27 with respect to the common shield 21 includes a voltage variation representative of the internal bioelectric voltage $e$ that is attempted to be measured across the body 11. This voltage output of the amplifier 27 is coupled by an appropriate transmitter 37 and receiver 39 combination to an oscilloscope or graph display 41 of a typical design. The transmitter-receiver combination 37 and 39 is provided so that the circuits electrically connected with the various body contacting electrodes are isolated from any earth grounds. These elements can actually be an FM transmitter and an FM receiver of some type but are most conveniently an optical coupler of a type commercially available. Isolation of these circuits from an earth ground, as mentioned previously is desired in order to prevent comparatively large currents from flowing in the patient 11 to the earth ground and thereby producing a potential difference across the skin of finite impedance between the electrodes 13 and 15 that is wholly unrelated to the internally generated bioelectric voltage $e$ which is desired to be measured. By having such an ungrounded system, these potential gradients are substantially eliminated but it has still been found that some current does flow, although of a smaller magnitude, through the common electrode 17 and its connecting conductor 43 because of a capacitive type coupling with ground or some other surrounding potential as indicated at 45 on FIG. 1.

Rather than connecting the conductor 43 directly to the common shield 21 of the amplifier 27, as is done in prior art devices as illustrated in FIG. 2, a second differential input operational amplifier 47 is provided with its output connected both to drive the common shield 21 and also to a feedback path to the inverting input of the amplifier 47. Conveniently, this feedback path has zero impedance. The noninverting input of the amplifier 47 is electrically connected by a conductor 48 to the reference electrode 19. The conductor 48 is provided with a shield 49 that is electrically connected to the output of the second amplifier 47. The cable 48, 49 is a low noise type. This circuit thus has the distinct advantage of a shielded conductor wherein the shield and the conductor itself are of the same potential. Therefore, substantially no current should flow in the line 48 and thus the true common potential of the body 11 is sensed in the conductor 48. The input impedance of the amplifier 47 is made to be as high as possible so that substantially no current flows in the conductor 48, thereby assuring that the body potential exists therein without being drawn down by a current flow. The amplifier 47 is connected in a unity gain voltage follower mode.

Battery or other isolated power sources 51 and 53 are connected from the conductor 43 to the amplifier 47 to provide its power. The conductor 43 thus becomes the common point of the amplifier 47. The result of this circuit is that the amplifier 47 moves the voltage of the common shield 21 up and down the same direction and substantially the same magnitude as the common voltage $v$ on the body 11 moves up and down. Variations in the body voltage $v$ are caused for example by charged articles such as worn clothing being moved in the same room wherein the electrocardiograph is being taken. The circuit of amplifier 47 that are within the compartment 22 of the common shield 21 may conveniently formed as part of a single structure including the electrodes 17 and 19 rather than with the circuits in the compartments 20.

As a result of the technique of the present invention being carefully studied since its discovery, it is believed that the reason for the undesired noise in the prior art techniques is caused in large part by unequal impedances between the sensing electrodes 13 and 15 and between the resistances R1 and R2. The common body voltage $v$ raises the voltage of the sensing electrodes 13 and 15 as well as affecting the electrodes 17 and 19. These changes of the body voltages $v$, unequal time varying impedances in the two input circuits to the amplifier 27 and unpredictable time varying half-cell potentials are believed to cause (by the prior art technique) an undesired differential voltage in the output 35 that is unrelated to the internally generated bioelectric voltage $e$ that is attempted to be measured. This is explained further hereinafter with respect to FIG. 2.

FIG. 3 illustrates a simplified model of the human skin which is shown at 55 connected to series with a non-capacitive type of electrode 57 to produce a voltage signal in a line 59. The skin 55 equivalent circuit includes the parallel capacitance and resistance in the path of sensing the body voltage at the point that the electrode 57 is positioned. The electrode 57 in its contact with the skin includes three parallel paths including the variable resistance, a variable half-cell potential and a variable capacitance. A capacitive type of electrode is illustrated in an equivalent circuit of FIG. 4 wherein the skin equivalent circuit 55 is connected in series with a capacitor 63 to an output conductor 65. The behavior of skin/electrode interfaces is extremely complex and not completely understood, so FIGS. 3 and 4 are presented as only very simplified models for the purpose of discussion.

Referring to FIG. 2, therefore, it can be appreciated how the prior art technique there illustrated can be subject to the undesirable noise from fluctuations in the body common voltage $v$. The blocks Z1 and Z2 of FIG. 2 represent the sensing electrodes 15 and 13, respectively, discussed with respect to FIG. 1 and are each of the complex equivalent circuit type of either FIG. 3 or 4, depending on whether they are a non-capacitive or a capacitive type. From FIG. 2, it can be seen that currents i1 and i2 generated in the electrode leads is the result of a common voltage $v$ effected by this complex circuit network and by the respective resistances R1 and R2. Both of the currents $i1$ and $i2$ flow through parallel paths to the common shield 21. The two inputs of the amplifiers 27 are, in effect, each connected in the middle of a voltage dividing circuit. The non-inverting input of the amplifier 27 is connected at the juncture of the series current path of Z1 and R1. Similarly, the inverting input of the amplifier 27 is connected at the junction of impedance Z2 and the resistance R2. If R1 is not exactly equal to R2 and if Z1 is not exactly equal to Z2, the voltages presented to the inputs of the amplifier 27 as a result of a variation in the common body voltage $v$ will be different. This difference shows up at the amplifier output 35 in addition to the desired signal representative of the desired bioelectric potential. Additionally, current flow through the sensing electrodes 13 and 15 changes their half-cell potential. These unequal voltages at the inputs of the amplifier 27 are substantially eliminated by the technique shown in FIG. 1 wherein the common point 21 is made to vary the same amount $v$ as the input voltage to the equivalent impedances Z1 and Z2. The currents $i1$ and $i2$ caused by the common voltage variations $v$ on the body 11 substantially disappear with the use of the circuit of FIG. 1.

In the prior art technique illustrated in FIG. 2, a single common electrode 67 represented in FIG. 2 by an equivalent impedance Z3 is the common electrode. A current i3 is believed to flow in a conductor connected therewith as a result of the varying voltage $v$ and a capacitive coupling with a ground potential indicated at 69. Referring to FIG. 5, a hypothetical voltage variation $v$ is indicated in a solid line and a voltage $v3$ of FIG. 2 at the output of the common electrode 67 is shown in dotted outline. These two voltage curves of FIG. 5 differ by a voltage amount which is the voltage drop across the impedance of the common electrode 67. Thus, in the prior art technique illustrated in FIG. 2, the common point 21 of the amplifier 27 differs from the common body variations applied to electrodes Z1 and Z2 by the voltage drop across the electrodes 67. This voltage difference between the point 21 and the common body voltage $v$ is believed responsible for the currents $i1$ and $i2$ which is in turn believed to be responsible for problems of noise in the output 35 of the amplifier 27 from the input voltage dividing circuits and half-cell potentials at the electrode/skin interfaces. The voltage drop across 23 is equal to this undesired voltage difference between the point 21 of FIG. 2 and the common body voltage $v$ and is generated by the current $i3$.

Referring to the technique of the present invention illustrated in FIG. 1, a voltage $v3$ of FIG. 5 also exists in the line 43 to the common electrode 17. What the amplifier 47 of FIG. 1 does is invert the voltage drop across the electrode 17 and add it to the quantity $v3$ to produce an output of the amplifier 47 which is the same as the voltage waveform $v$ of FIG. 5 that was presented to the common electrode 17. The amplifier 47 sees between its line 48 and common line 43 the voltage drop across common electrode 17 and it is this voltage drop that is inverted to form the true body skin potential at the common point 21.

It may be noted that when the electrodes 13 and 15 are of a capacitive type that the capacitive reactance for low frequency variations of $v$ is of a magnitude about the same as the magnitude of resistances R1 and R2. The result is since the capacitive reactances will differ, large errors in the voltages applied to the two inputs of the amplifier 27 occur. Therefore, prior art techniques using capacitive electrodes are especially susceptible to movements of charged clothing in the same room wherein an electrocardiogram is being taken.

Although the present invention has been described with respect to a specific embodiment, it will be understood that the various aspects of the present invention are to be protected within the full scope of the appended claims.

We claim:

1. In a method of measuring bioelectric potentials across a body comprising the steps of locating at least two electrodes at at least first and second spaced apart positions on said body, and electronically subtracting the potentials detected by the electrodes to obtain a signal representative of the desired bioelectric potential across the body with respect to a voltage common point, an improved method of coupling said common point to the body comprising the steps of:

positioning two additional electrodes on said body, electronically connecting one of said two additional electrodes to an input of a high impedance amplifier connected in a unity gain voltage follower mode, connecting the other of said two additional electrodes to a common terminal of said amplifier, and transferring the electrical potential at an output of said voltage amplifier to said voltage common point.

2. The improved method of claim 1 wherein said coupling step includes coupling without the use of an earth ground connection, the improvement comprising the additional step of coupling said bioelectric potential representative signal to a display apparatus without use of any wired electrical connection, whereby said display apparatus may be connected to an earth ground without grounding the bioelectric potential signal producing equipment.

3. In a method of measuring bioelectric potentials across a body comprising the steps of locating at least two electrodes at at least first and second spaced apart locations of a body and electronically subtracting the potentials detected by the electrodes from one another to obtain a signal representative of a desired bioelectric potential across the body with respect to a voltage common point, an improvement comprising the steps of:

attaching a current carrying electrode having an electrical lead to a third location on said body, whereby a current flows in said lead developing a voltage drop across an impedance thereof, attaching a voltage measuring electrode to a fourth location on said body, developing a difference potential signal between the voltage in said current carrying conductor and the voltage measuring electrode and adding that measured potential to the potential of said current carrying conductor, thereby to generate a voltage signal substantially the same as a common body voltage, and driving said voltage common point with said combined voltage signal.

4. A method of developing a voltage signal that is proportional to electrostatic voltage variations on a body for use in noise compensation, comprising the steps of:

attaching a first electrode to said body and electrically connecting the first electrode with an amplifier common, and attaching a second electrode to said body and electrically connecting it to a high impedance input of an amplifier that shares said amplifier common, whereby an amplifier output developes said voltage signal proportional to body surface voltage changes.

5. Apparatus for developing a signal proportional bioelectric potential across a body, comprising:

a high input impedance instrument amplifier having at least two inputs, a common reference point and an output delivering a voltage proportional to the difference in voltage level at said inputs with respect to said common point, means for electrically connecting two independent potential detecting electrodes to each of the said at least two amplifier inputs, whereby electrodes so connected may be electrically connected to said body for developing said signal proportional to the biooelectric signal across said body at said instrument amplifier output, a second amplifier having inverting and non-inverting inputs and an output connected to drive said amplifier common point with a voltage with respect to a common point of the second amplifier, said inverting input being coupled to its output, and means for connecting two additional electrodes to said second amplifier non-inverting input and said second amplifier common point.

6. Apparatus according to claim 5 wherein said means for connecting an electrode to said second amplifier non-inverting input includes a shield therearound which is electrically connected with said second amplifier output, whereby substantially no current flows in this electrode conductor.

7. Apparatus according to claim 5 which additionally includes a display means and electrically isolated means for coupling said instrument amplifier output signal to said display means, whereby the equipment is isolated from any ground potential of said display means.

8. In a method of measuring a bioelectric potential of a body comprising the steps of contacting an electrode against said body and electronically developing from said electrode a voltage signal with respect to a common point that is proportional to said bioelectric potential for monitoring the body bioelectric potential, a method of driving the voltage of said common point to follow voltages induced in said body, comprising the steps of:

attaching a current carrying electrode to said body and electrically connecting the current electrode with an amplifier common, attaching a voltage measuring electrode to said body and electrically connecting said voltage electrode to a high impedance input of an amplifier that shares said amplifier common, and driving said common point with an output of said amplifier.

9. In an instrument having electronic means with at least one input for connection to a body contacting electrode and an output for developing a voltage with respect to a common point that is proportional to a bioelectric potential of said body, the improvement of means for controlling the voltage of said common point, comprising:

an amplifier having inverting and non-inverting inputs and an output connected to drive said common point with a voltage with respect to a common of the amplifier, said inverting input being coupled directly to said amplifier output, means for electrically connecting a body contacting current carrying electrode to said amplifier common, and means for electrically connecting a body contacting voltage electrode to said non-inverting input.

10. The improved instrument of claim 9 wherein said means for electrically connecting a body contacting voltage electrode to said non-inverting input includes a shield therearound which is electrically connected to said amplifier output.

* * * * *